Patented Jan. 19, 1954

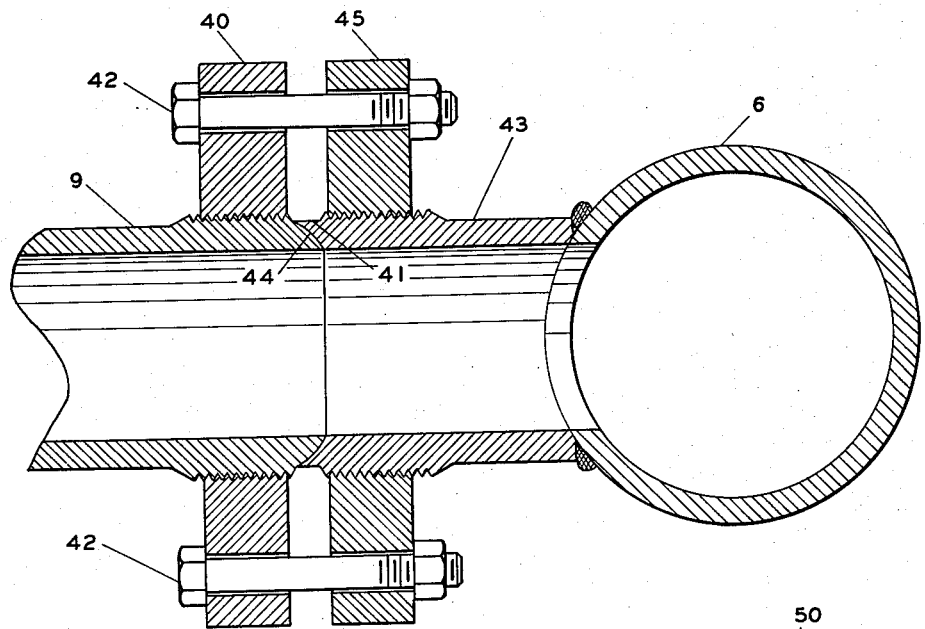
FIG. 3
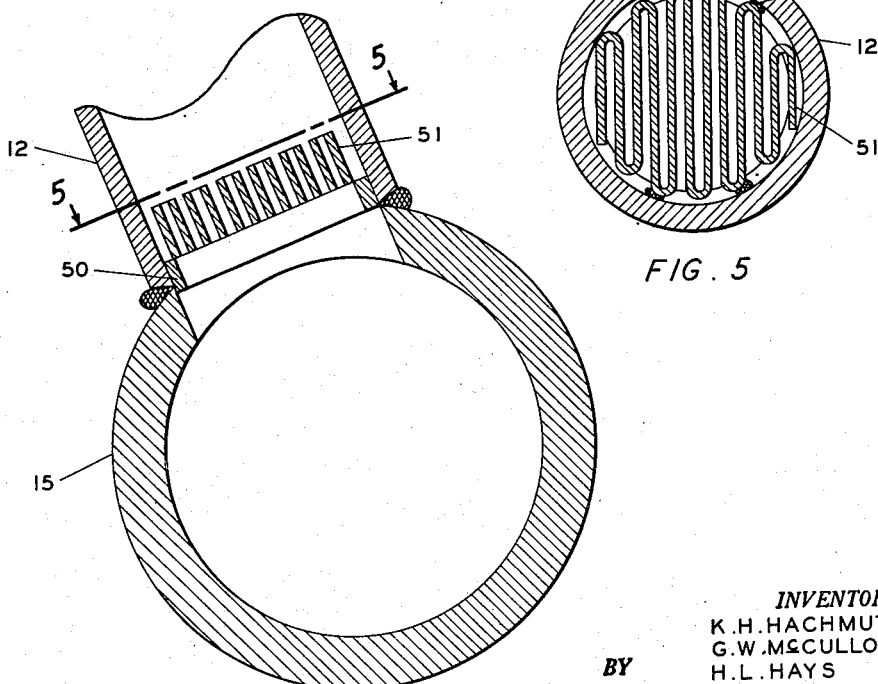
FIG. 4
FIG. 5

2,666,692

UNITED STATES PATENT OFFICE 2,666,692

CATALYTIC REACTOR TUBE ASSEMBLY

Edward Dolezal, Harrison L. Hays, Gerald W. McCullough and Karl H. Hachmuth, Bartlesville, Okla., assignors to Phillips Petroleum Company, a corporation of Delaware Application July 21, 1947, Serial No. 762,314

8 Claims. (Cl. 23—288)

This invention relates to improvements in catalyst cases having an assembly of tubes adapted to contain solid catalysts. This application is a continuation-in-part of our application Serial No. 540,676, filed June 16, 1944, now abandoned.

In many catalytic conversion processes rapid and/or extreme temperature changes are encountered at some point in a conversion-regeneration cycle of operation. Proper control of reaction conditions may require very rapid heating or cooling of catalyst; and as this is difficult when solid catalyst material is arranged in beds it has become customary to carry out such reactions by passing reactants into contact with solid catalyst material contained in tubes, over which heating or cooling fluid may be made to flow.

It is often desirable to control the temperature of catalytic reactions within very narrow limits. Rapid and extreme temperature changes may also be necessary at some point in the cycle of operations. A catalyst case apparatus containing an assembly of tubes adapted to maintain even temperatures over a very wide range and to permit rapid and extreme changes of temperature is a very desirable advance in the art.

It is an object of this invention to provide a catalyst case apparatus containing an assembly of tubes adapted to contain solid catalyst materials in which isothermal reaction conditions may be approximated.

Another object is to provide a catalyst case apparatus, comprising an assembly of tubes adapted to contain solid catalyst materials, which is adapted to permit rapid and extreme variations in temperature while maintaining substantially even distribution of temperature in the tubes.

Another object is to provide an improved catalyst case apparatus adapted to permit the addition and withdrawal of heat to solid catalyst material contained in tubes under accurately controlled conditions.

Another object is to provide an improved catalyst case apparatus which is especially effective for dehydrogenation processes, such as dehydrogenation of n-butane or butene.

Still another object is to provide a catalyst case apparatus which is simple, rugged, foolproof and cheap in construction and which has the particular advantageous combination of parts as shown.

Other objects and advantages will become apparent from the following detailed description.

Figure 1:
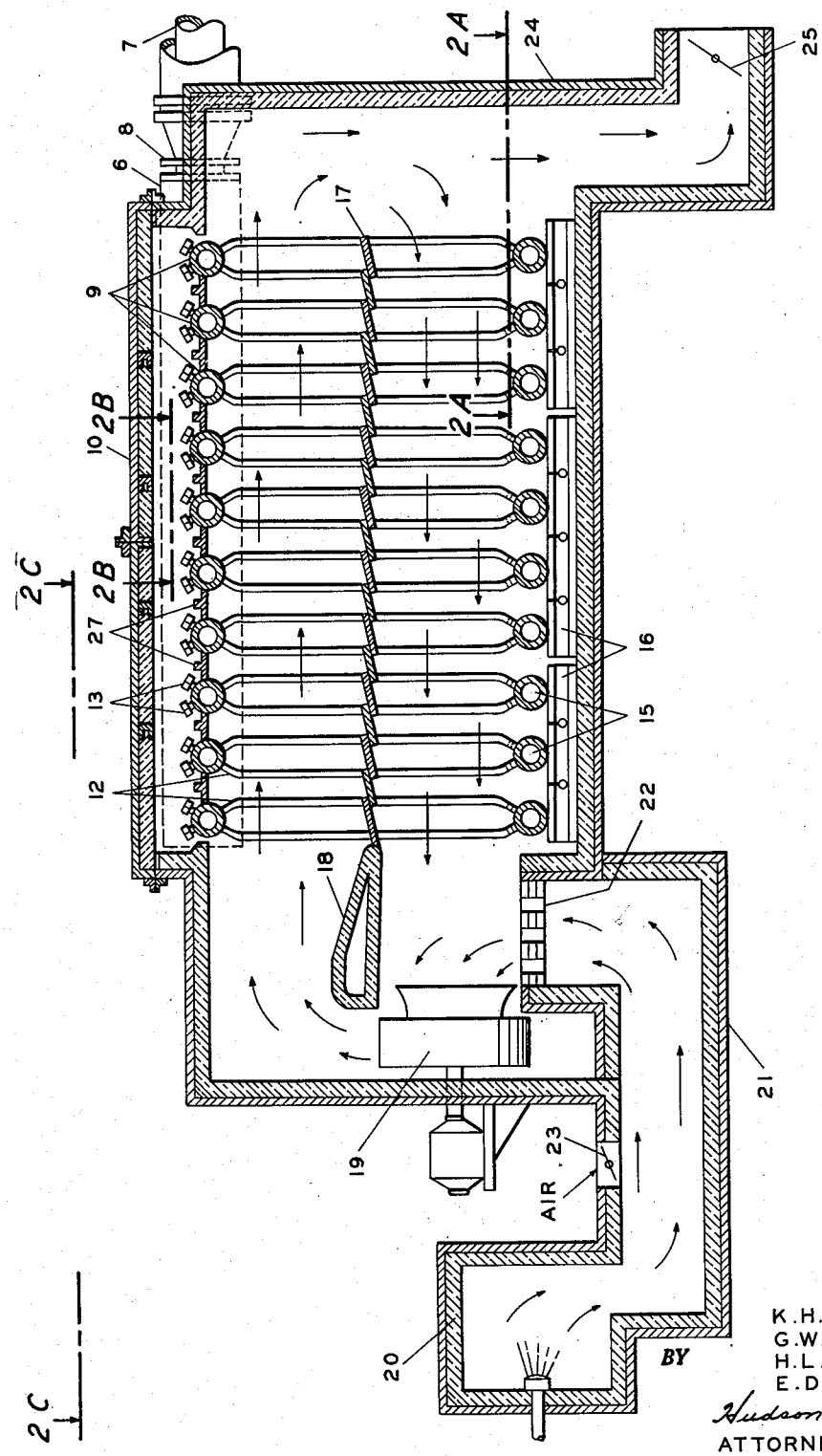
Figure 2:
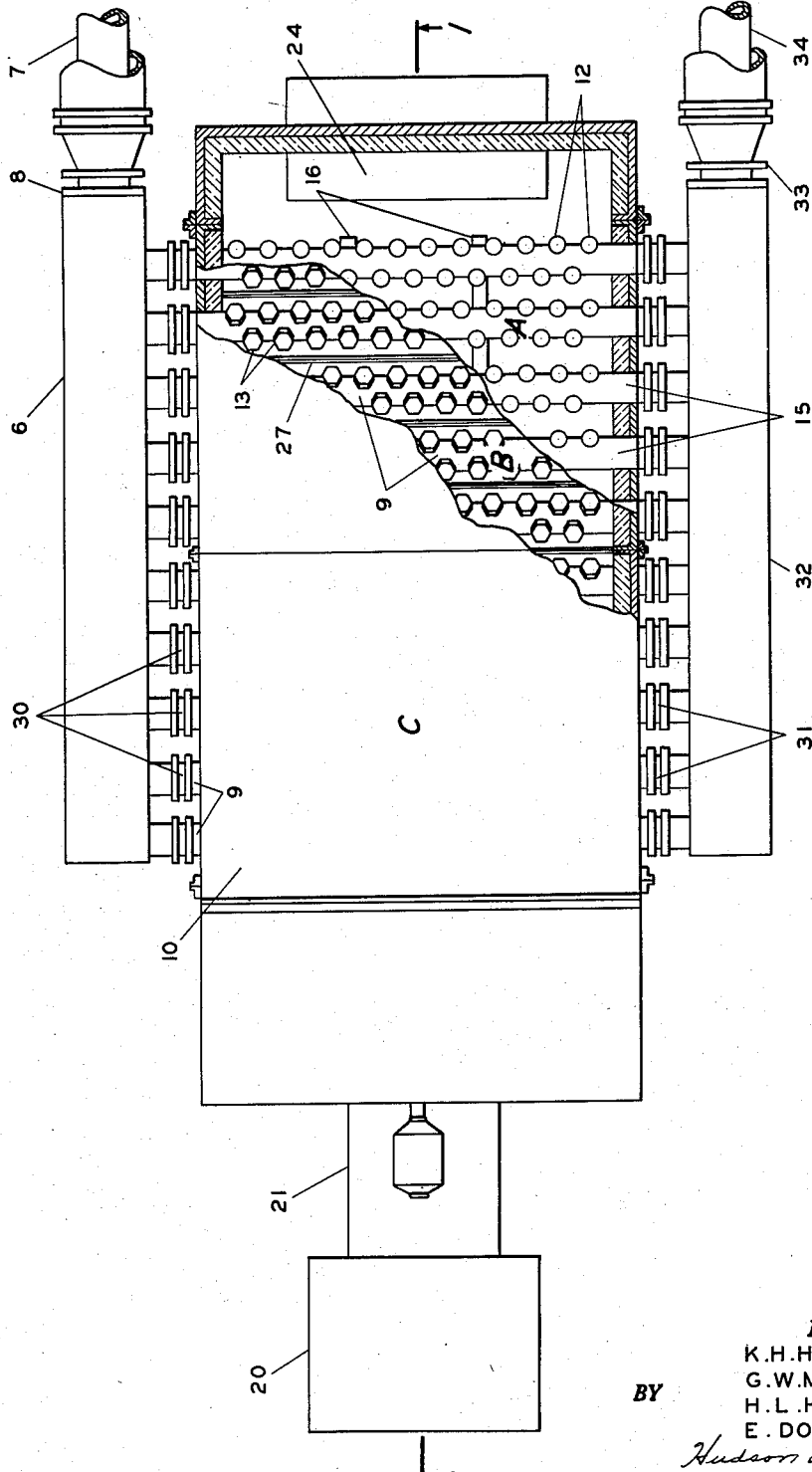

The accompanying drawing portrays diagrammatically one form of equipment embodying the principles of the present invention. Fig. 1 is a vertical section through a catalyst case constructed in accordance with the principles of this invention. Fig. 2 is a plan view of the same case, portion A showing a partial cross section at the line 2A, portion B showing a partial cross section at the line 2B, and portion C showing a plan of the top of the case. Fig. 3 is a vertical section, in detail, of cross header connections. Fig. 4 is a vertical section through the lower part of a catalyst tube showing a catalyst retaining member and cross header connection. Fig. 5 is a cross section of a catalyst tube on the line 5—5 and shows a plan view of a catalyst retaining member. Like numerals refer to like elements in all figures.

The invention will be described with particular reference to a catalyst case apparatus which has been found to be exceptionally effective for the catalytic dehydrogenation of n-butane to butene and butene to butadiene.

Two pipe lines extend to such an apparatus, one for carrying a feed comprising n-butane or butene to the catalyst case and another for carrying away the products of reaction. These pipe lines respectively are detachably connected to a main inlet header and a main outlet header, preferably disposed on opposite sides of an insulated housing, by movable joints adapted to permit the headers to move through a solid angle and thus to lie in any position within a cone whose axis is an extension of the axis of the corresponding pipe line at its junction with its header and whose apex is at the movable joint. Such joints are constructed by forming the adjacent ends of two sections of piping into the shape of spherical zones, the end of one pipe being convex, and that of the other being concave, and fastening the shaped pipe ends together by some suitable clamping device permitting swinging movement of one pipe. Such a joint is referred to in this specification and claims as a "spherical joint."

One or more cross headers extend horizontally from the main inlet header into and substantially across an insulated housing. An equal number of cross headers extend horizontally from the main outlet header into and substantially across the insulated housing and are so disposed that in each pair, consisting of an inlet cross header and an outlet cross header, one lies substantially vertically below and parallel to the other. Each cross header, both inlet and outlet, contains a detachable, spherical joint at or near its junction with the corresponding main header.

Each inlet cross header is connected to its corresponding outlet cross header by a plurality of curved tubes adapted to contain solid catalyst material. These tubes communicate with the interior of the cross headers to which they are attached and alternate tubes are curved outward from opposite sides of the headers so that for the greater portion of their length or preferably for substantially their entire length the tubes lie outside a vertical plane connecting the axes of the two cross headers to which they are attached. The uppermost of these two cross headers is provided with openings for charging solid catalyst material to the tubes and these are closed by removable plugs. A catalyst retaining member is disposed in each tube adjacent the junction of the tube with the lower of its two cross headers. This catalyst retaining member consists of a flat strip of metal folded back and forth upon itself in a manner analogous to the folds of a bellows or accordion. The catalyst retaining member is attached to the interior of the tube by spot welding at points substantially removed from the extremities of alternate bends.

The entire assembly of headers and tubes described above, with the exception of main inlet and outlet headers, feed and product lines, is enclosed in a heat insulated housing preferably constructed with sides and top demountable in sections. Supporting rails are disposed adjacent the bottom of this insulated housing and the lower cross header or series of cross headers rests slidably upon these rails. The housing extends beyond the banks of tubes at each end forming a circulation space which is preferably larger at one end than at the other. A fan adapted to circulate gases is located in the larger of these circulating spaces. A flexible, extensible baffle, preferably constructed according to the principles disclosed in the copending application of L. J. Weber, Serial No. 671,107, filed May 20, 1946, now Patent No. 2,586,403 of February 19, 1952, extends across the housing in a plane intersecting the catalyst tubes. A flow directing member may extend from the edge of the baffle nearest the fan to a position sufficiently near the fan to insure circulation of gases driven by the fan, in a continuous path in the housing.

From a source of heated gases such as a Dutch oven a conduit adapted to convey hot gases extends to and communicates with the larger of the circulation spaces within the insulated housing at a location between the catalyst tubes and the fan and upstream of the fan in the path of flow of gases circulating in the housing. This conduit contains a means for admitting a controlled amount of cold air to the conduit. Communication between the conduit and the interior of the catalyst case is established by means, such as a grid or grating, for getting gases into the housing at substantially right angles to the direction of flow of gases in the housing at the point of communication. From the smaller of the circulation spaces within the housing a second conduit adapted to conduct waste gases from the interior of the housing leads to and communicates with a stack or other means for disposal of waste gases. A flow controlling device such as a damper is disposed within this second conduit.

Such a catalyst case apparatus is especially advantageous in the dehydrogenation of butane to butene and butene to butadiene. It is necessary in some methods for conducting these reactions to change the temperature of catalyst contained in tubes as much as 400° F. in a time of 20 minutes or so while maintaining substantially even temperatures in all parts of the catalyst tube assembly. Accurate temperature control and elimination of stratification of gases at widely different temperatures is highly desirable in a process of this type.

Referring to the drawings in Fig. 1, reference numeral 6 shows the main inlet header connected to a stationary pipe line 7 by spherical joint 8. From main header 6 inlet cross headers 9 extend into and across insulated housing 10, having a top and sides constructed in demountable sections. Catalyst tubes 12 are connected to each of these inlet cross headers 9. Openings in inlet cross headers 9 are closed by removable plugs 13. These are disposed diametrically across the inlet header from catalyst tubes 12 and serve the purpose of admitting catalyst into the tubes. The catalyst tubes 18 each contains a catalyst retaining member near its lower extremity adjacent its junction with an outlet cross header. These outlet cross headers extend across the insulated housing and outside the same. Outside the housing they connect with a main outlet header or manifold (not shown) by means of spherical joints. These outlet cross headers rest slidably upon supporting rails 16 disposed in the bottom of the insulated housing. The weight of catalyst tubes is borne by these outlet cross headers 15. The catalyst tubes support the inlet cross headers and these in turn at least partially support the main inlet header. A flexible baffle 17 extends across the housing in a plane intersecting the tubes 12. A flow directing member 18 is attached to the end of this baffle nearest fan 19. A source of heated gases 20 is disposed outside said housing and is connected to and communicates therewith via a conduit 21 and jetting means 22. Jetting means 22 is located upstream of the fan and downstream of catalyst tubes 12 in the continuous path of circulating gases within housing 10. A means for admitting cold air in a controlled amount 23 is disposed in said conduit. From the circulation space in the housing 10 at the end opposite the fan, a conduit 24 extends to a stack or other means of disposing of waste gases (not shown). A means 25 for controlling the amount of gas passing through such conduit is disposed in conduit 24.

Fig. 2 shows the catalyst case assembly in plan view. In portion A catalyst tubes 12 are shown in cross section near their point of attachment to outlet cross headers 15. These outlet cross headers each contains a detachable spherical joint 31 adjacent to its junction with main outlet header 32. Main outlet header 32 also is provided with a detachable spherical joint 33 at its junction with stationary pipe line 34.

On portion B inlet cross headers 9 are shown extending from main inlet header 6 into and across the interior of the insulated housing 10, but not in contact with the wall of housing 10 opposite the main inlet header 6. Removable plugs 13 close openings in inlet headers 9. Spacing members 27 are disposed to fit loosely between inlet headers 9 and serve the double purpose of restraining the movement of headers 9 somewhat and preventing direct contact of hot gases with plugs 13 which would make them very difficult to remove.

Fig. 3 shows in detail the construction of a spherical joint in a cross header. All spherical joints in the apparatus are formed according to this general principle. These include a joint 30 in each inlet cross header, a joint 31 in each outlet cross header and the joints 8 and 33 in main headers 6 and 32. The reference numeral 6 in Fig. 3 refers to the main inlet header, shown in cross section, to which a portion 43 of an inlet cross header is attached, preferably by welding. The end 41 of portion 43 is formed in the shape of a concave spherical zone. End 44 of the principal portion of cross header 9 is formed in the shape of a convex spherical zone having a somewhat shorter radius of curvature than end 41. Flanges 40 and 45 are attached to portion 43 and the principal portion of header 9. A plurality of bolts 42 secure the ends 41 and 44 in contact by pressure exerted on flanges 40 and 45.

In Fig. 4 a catalyst tube 12 is shown attached to an outlet cross header 15 by welding. A retaining ring 50 is disposed in catalyst tube 12 adjacent the junction of tube 12 with header 15. A catalyst retaining member 51, formed by folding a flat strip of metal rests upon retaining ring 50.

In Fig. 5 retaining member 51 is shown in place in catalyst tube 12, resting upon retaining ring 50. Member 51 is attached to the interior of tube 12 by spot welding. The spot welds 52 must be made at points substantially removed from the ends of the bends of member 51 for maximum efficiency under severe operating conditions.

It will be seen that a catalyst case apparatus constructed according to the principles of our invention possesses maximum flexibility in construction combined with cheapness of construction, ease and cheapness of maintenance and repair and permits great flexibility in temperature of operation while maintaining even temperatures in the catalyst tubes. One main header can expand or contract freely without setting up undue stresses in the cross headers. Great expansion or contraction of both main headers can occur and this merely results in causing the outlet headers to slide on their supporting rails. The expensive overhead hangers usually present in catalyst tube assemblies are eliminated. The weight of the upper part of the tube assembly is carried on a relatively large number of curved tubes and expansion or contraction of these merely causes the inlet cross headers and inlet header to move up and down. When a single tube of such assembly becomes plugged by catalyst so that reactants cannot pass through it often happens that the temperature of that tube increases or decreases greatly with respect to other tubes in the same assembly or harp. Since the catalyst tubes are so curved that for the greater portion of their length they lie outside a plane connecting the longitudinal axes of their corresponding inlet and outlet cross headers, such heated tube can expand freely by merely bending slightly and increasing its curvature. The alternate staggered position of catalyst tubes on the headers results in sufficient support of the inlet cross headers.

Thus it is seen that each individual catalyst tube can expand or contract independently, all catalyst tubes can expand or contract together, any cross header or main header can expand or contract independently or together or any combination of such expansions and contractions may occur without creating severe stresses in the tube assembly.

Substantially even temperatures may be maintained in all parts of the interior of the insulated housing by admitting gases of the desired temperature through a grating or other means for jetting such gases into the interior of the housing in a direction substantially perpendicular to the flow of gases within the housing, upstream of the fan and downstream from the bank of tubes nearest the fan. This causes maximum mixing and evening of the temperature before such gases strike the nearest bank of tubes. Temperatures within the housing may be accurately controlled by controlling amount and temperature of hot gases furnished by the Dutch oven or equivalent source of hot gases, controlling the amount of cold air blended with these hot gases in conduit 21, controlling the amount of gases discharged through conduit 24 and controlling the rate at which reactants are passed through the catalyst tubes. Very accurate temperature control may be obtained by utilizing these factors.

Retention of solid catalyst material in the catalyst tubes has presented a number of problems. Ordinary screens and gratings fail when exposed to violent fluctuations of overall temperature, such as the apparatus of the present invention is adapted to withstand. The flat folded strip of metal forming member 51 may be made broad enough to give sufficient rigidity to support solid catalyst material and spot welding alternate folds of member 51 to the interior of tube 12 at points substantially removed from the extremities of the bends allows great expansion or contraction to occur without displacing the catalyst retaining member from its position.

When failure of such an apparatus occurs it is usually caused by breaking or plugging of one or more catalyst tubes. Our preferred construction of the insulated housing together with our tube assembly makes repair very easy and cheap. All that is necessary is to remove sections of sides and top of the housing, disconnect the detachable spherical joints of inlet and outlet cross headers and lift an entire bank or "harp" of tubes with its attached cross headers out for repair. A spare bank of tubes with headers is then swung into the vacated position, attached and the housing is reassembled. This procedure allows the repairs to be made with minimum off-stream time for the catalyst case.

It will be obvious to those skilled in the art that many modifications and changes in details of construction may be made in our apparatus without departing from the spirit of our invention which is limited only by the subtended claims.

We claim:

1. A catalyst case assembly comprising a series of parallel vertically disposed harps each comprising an upper horizontal header having a closed end and a spherical-jointed end, a lower horizontal header parallel to said upper header having a closed end and a spherical-jointed end in reverse order, and a series of spaced-apart catalyst tubes arranged in two parallel rows on opposite sides of a plane passing thru the axes of said headers, said tubes being curved at each end so as to offset same from said plane and the spherical-jointed ends of said headers extending beyond the outermost tubes on the respective ends a substantial distance so as to provide space for a wall of said hereinafter-named case between the header ends and said outermost tubes; a heat insulating case surrounding said series of harps so as to permit the open ends of said upper headers to extend thru one said of said case and the open ends of said lower headers thru the other side thereof and so as to provide open space between the ends of said case and the outermost harp in each instance, said case having detachable top and side sections permitting removal of any one of said harps with only partial dismantling of the case; a pair of parallel supporting rails for said harps in slidable arrangement with the lower sides of said lower headers at right angles thereto; a furnace communicating with one end of said housing for supplying hot combustion gas thereto; an exhaust conduit at the opposite end of said case; and a pair of manifolds outside of said case, one connecting with the spherical joints of said upper header and the other with the spherical joints of said lower header thereby providing for flow of gases from one manifold thru said harps to the other manifold.

2. The catalyst case assembly of claim 1 including baffle means extending transversely of said catalyst tubes intermediate and substantially parallel with said headers and detachable in sections individually with said harps, said baffle means forming upper and lower gas passageways thru said harps from the furnace end of said case to the exhaust end thereof; and a blower at the furnace end of said case disposed so as to circulate hot gas thru said passageways in opposite directions.

3. A harp of catalyst tubes constructed so as to detachably connect by joints to a pair of parallel manifolds at diagonally opposite corners of the harp along with a series of similar harps, said harp comprising a pair of parallel spaced-apart tube headers each having a closed end and an open jointed end in reverse order on the two headers; and a series of spaced-apart catalyst tubes connecting said headers and arranged in two parallel rows on opposite sides of a plane defined by the axes of said headers, said tubes being curved at each end so as to offset same from said plane and align the end sections of the tubes with a diameter of the header.

4. The harp of claim 3 in which the tubes in one row are opposite the spaces between tubes in the other row.

5. The harp of claim 3 including a series of openings in one of said headers diametrically opposite the juncture of the catalyst tubes with said headers and removable plugs in said openings adapted to provide easy access to said tubes for filling with catalyst and cleaning.

6. A catalyst case assembly comprising a series of the harps of claim 3 in vertical parallel spaced-apart arrangement, each detachably connected at the open end of its upper header by means of said spherical joint with a common manifold line and at the open end of its lower header by means of said spherical joint with a second manifold line, thereby providing for flow of fluid through the harps from one manifold to the other and permitting enclosure of the series of harps with a common case or housing with said manifold lines on the outside of said case.

7. The catalyst case assembly of claim 6 in combination with a common support for said harps disposed adjacent the lower side of the lower tube headers in slidable relation therewith; a heat insulating housing surrounding said case assembly having detachable sections on the top side and on the lateral sides adjacent said manifolds permitting lifting an individual harp out of the assembly without disturbing the other harps, said manifolds being outside of said housing; and means for passing hot gas over the tubes of said harps.

8. A harp of catalyst tubes constructed so as to detachably connect to a pair of parallel manifolds at diagonally opposite corners of the harp along with a series of similar harps, comprising an upper header having a closed end and a jointed open end; a lower header having a closed end and a jointed open end in reverse order to the ends on said upper header; a plurality of spaced-apart catalyst tubes curved at their ends connecting said headers and arranged in two rows on opposite sides of the plane defined by the axes of said headers so that the open ends of said headers extend substantially beyond the last catalyst tubes at the respective ends so as to provide space for the wall of a case housing between said tube and said open ends.

EDWARD DOLEZAL.
HARRISON L. HAYS.
GERALD W. McCULLOUGH.
KARL H. HACHMUTH.

References Cited in the file of this patent

UNITED STATES PATENTS

| Number | Name | Date |
|---|---|---|
| 1,094,416 | Baxter | Apr. 28, 1914 |
| 1,202,502 | Forth | Oct. 24, 1916 |
| 1,607,254 | Fantz | Nov. 16, 1926 |
| 1,794,006 | Falla | Feb. 24, 1931 |
| 2,270,913 | Venema | Jan. 27, 1942 |
| 2,389,448 | Mekler | Nov. 20, 1945 |

FOREIGN PATENTS

| Number | Country | Date |
|---|---|---|
| 309,169 | Great Britain | June 19, 1930 |